United States Patent [19]

Shih

[11] Patent Number: 4,635,303

[45] Date of Patent: Jan. 13, 1987

[54] FOLDABLE TOILET-SEAT FOR CHILDREN

[76] Inventor: Peng Shih, 3rd Fl., No. 8, Alley 2, Lane 186, Kang Yao Street, Nei Hu District, Taipei, Taiwan

[21] Appl. No.: 796,696

[22] Filed: Nov. 12, 1985

[51] Int. Cl.[4] ............................................. E03D 11/00
[52] U.S. Cl. ........................................ 4/254; 4/235; 4/239
[58] Field of Search ............... 4/254, 252 R, 234, 235, 4/237, 239

[56] References Cited

U.S. PATENT DOCUMENTS

| | | | |
|---|---|---|---|
| 1,297,177 | 3/1919 | Johnson | 4/254 UX |
| 2,607,926 | 8/1952 | DePupy | 4/254 |
| 2,698,440 | 1/1955 | Lyons | 4/254 |
| 3,383,714 | 5/1968 | Minasian et al. | 4/254 |

*Primary Examiner*—Henry K. Artis

*Attorney, Agent, or Firm*—Lowe, Price, LeBlanc, Becker & Shur

[57] ABSTRACT

The present invention relates to a foldable toilet-seat and, in particular, to a foldable toilet-seat for children around the age of 3 to 10. The invention comprising of a mini toilet-seat, a supporting board, handrail and etc. The mini toilet seat lies in between the stool cover and toilet seat. If the foldable toilet seat is not in use, mini toilet-seat, handrail, supporting board can be folded at predetermined pivots, and it leans against the front edge of water tank. When the foldable toilet-seat is in use, the mini toilet-seat retains on toilet seat and the size of mini toilet-seat can have suitable dimension for children, additionally, the height of supporting board is also convenient for all ages of children. The said supporting board is provided for children to go up and to sit on the stool and to place his legs without having the assitance from their parent. Since the legs can be firmly placed on supporting board, therefore, it enhances comfort and safety while sitting on the mini toilet-seat.

6 Claims, 4 Drawing Figures

FOLDABLE TOILET-SEAT FOR CHILDREN

BACKGROUND OF THE INVENTION

The present invention relates to a foldable toilet seat for children, in particular, to a mini toilet-seat retains on toilet-seat of the common stool, such arrangement is suitable for children whose age is between 3 to 10 years old.

Nowadays, in most families, sitting-type stool are very popular. However, the height and size of such stools are not suitable for children, usually the toilet-seat is too large for children, as a result, assistance must be given to the children when they are discharging.

SUMMARY OF THE PRESENT INVENTION

It is, therefore, an object of the present invention to provide a foldable toilet-seat apparatus for children which may obviate the above-mentioned drawbacks.

It is another object of the present invention to provide a foldable toilet-seat apparatus for children such that the size of said toilet-seat is suitable to retain on common toilet-seat and the size of foldable toilet-seat is adapted for the buttock of children.

Still another object of the present invention in addition to each of the foregoing objects is to provide a foldable toilet-seat for children in which the invention is easily assembled and can be easily mounted to any common stool.

Another and yet still further object of the present invention is the provision of such apparatus that can be folded and does not occupy space.

Other objects, features and advantages of the instant invention will become more apparent from the following description when taken in conjunction with the accompanying drawing which for purpose of illustration, but not of limitation.

DEATILED DESCRIPTION OF PREFERRED EMBODIMENT

Figure 1:
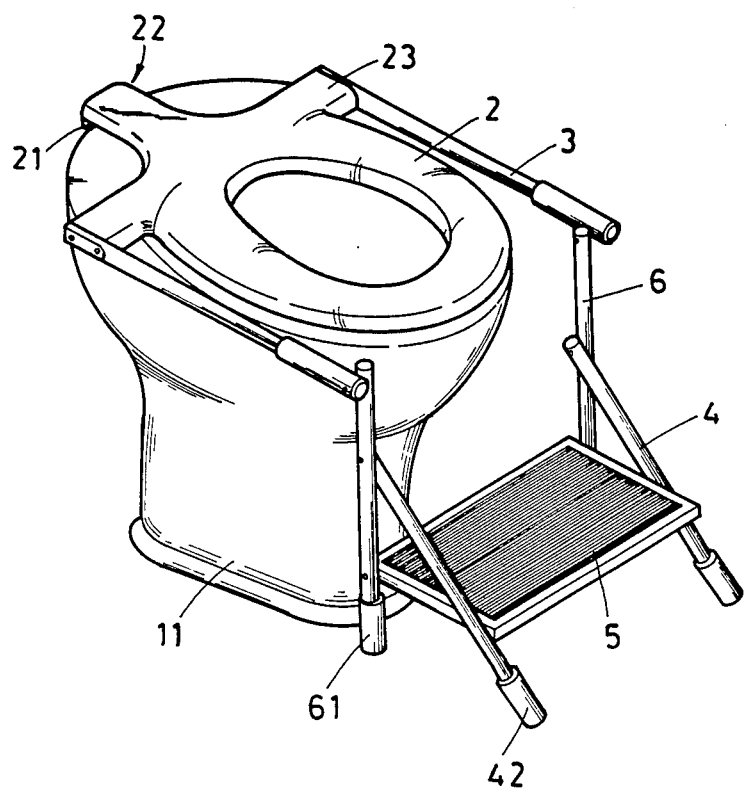
FIG. 1 is a perspective view of a foldable mini-toilet-seat retains onto a toilet-seat of common stool.
Figure 2:
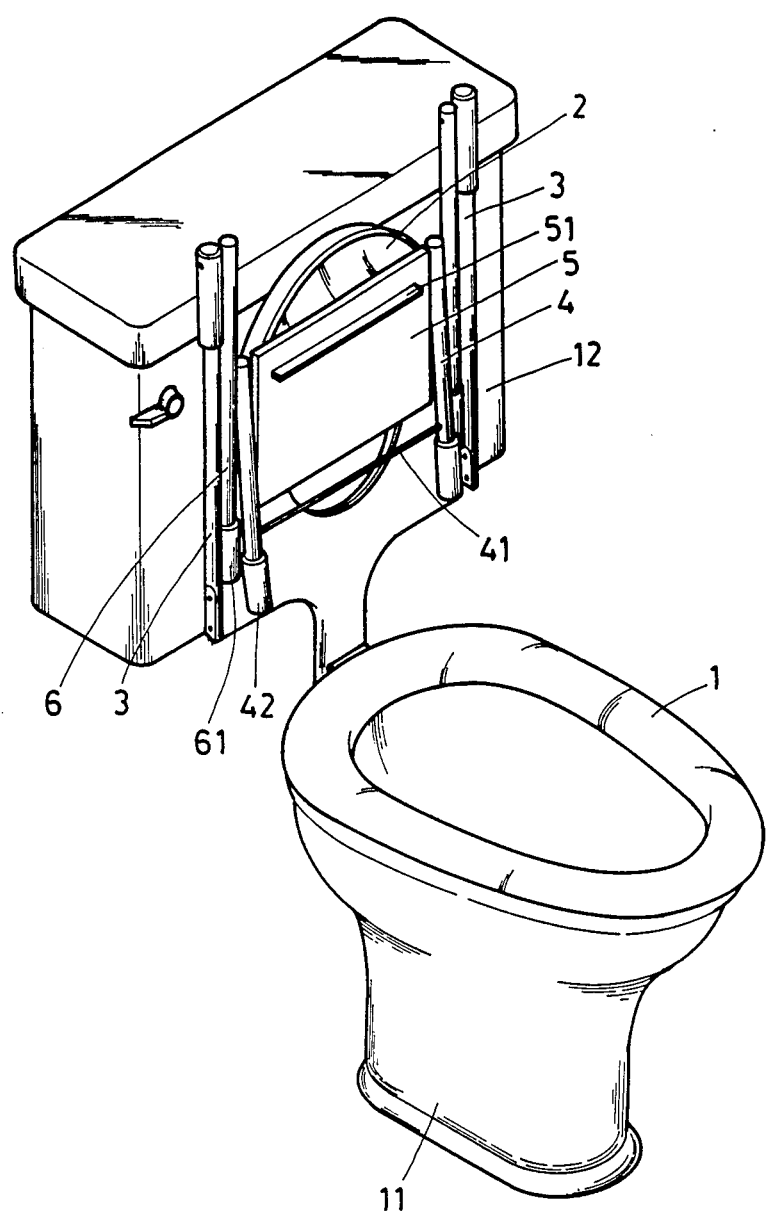
FIG. 2 is a perspective view of a foldable mini toilet-seat in which all parts of foldable mini toilet-seat is folded at provided pivots and leaned against the edge of water tank of stool.
Figure 4:
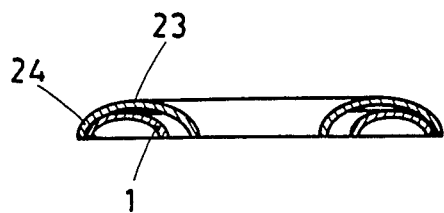
FIG. 4 is a schematic view illustrating the retaining of mini toilet-seat on toilet seat.
Figure 5:
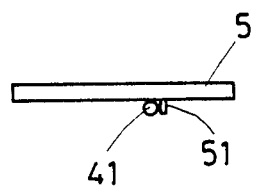
FIG. 5 is a schematic view illustrating the engagement of supporting board with the transverse bar.

With reference to FIG. 1 and FIG. 2, there is shown and illustrated a foldable toilet-seat for children constructed in accordance with the principles of the present invention. The present invention comprising a mini toilet-seat (2), handrail (3), slanting bar (4), a supporting board (5), supporting rod (6) and etc. At the top end of mini toilet-seat (2), a short piece of pipe (21) is mounted horizontally below the said end. By applying a screw, the mini toilet-seat (2) can be pivotally fitted with toilet seat at the back portion (22) of stool. Underneath the mini toilet-seat (2), groove (24) is provided such that the mini toilet-seat (2) can be retained on the toilet seat of stool. (As shown in FIG. 4). The mini toilet-seat (2) can be moved upward and downward freely about the pivot at the back portion (22), while at the lateral edges of mini toilet-seat, two protrusion (23) are provided so that one end of handrail (3) can be tightly secured such that the handrail (3) and mini toilet-seat (2) are at the same plan. The other end of handrail (3) is pivoted with each of the supporting bar (6), such that the said supporting bar (6) can be freely moved up and down about this point. About ⅓ of the total length away from the top end of supporting rod (6), a standing bar (4) is pivotally mounted at one of its end, while a supporting board (5) is disposed at about ⅔ of total length away from said rod (6). At the bottom surface of supporting board (5) a metallic strip (51) is disposed perpendicularly and form a hook, (as shown in FIG. 5) such that the hook can be engaged with the horizontal bar (41) which is transversely connected the two slanting bar (4) so that the said said slanting bar (4) will not be slided away.

Figure 3:
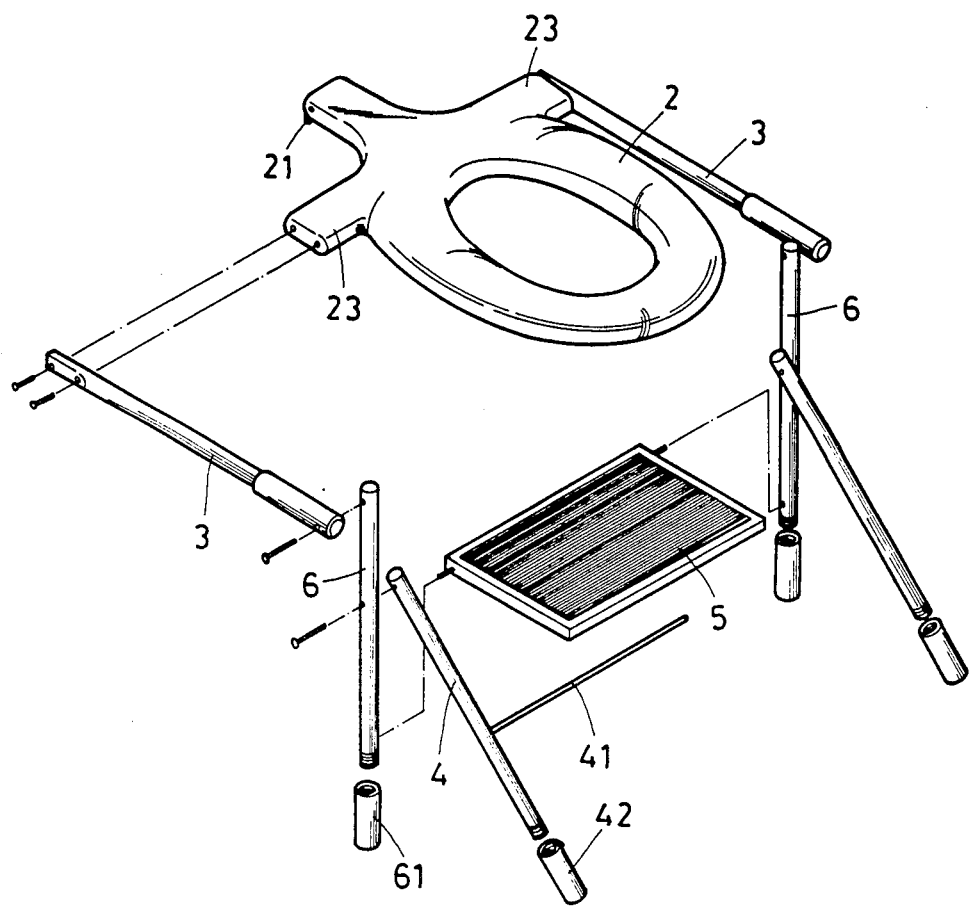
FIG. 3 is an exploded view of present invention.

With reference to FIG. 3, long adjustable nuts (61) (42) are screwed at the end of supporting bar (6) and slanting bar (4) respectively, such that the height of such apparatus can be adjusted in order to adapt the height of stool.

Turning now to FIG. 1 and FIG. 2, when the preferred embodiment is in operation, the mini toilet-seat (2) is retained on the top of toilet-seat (1), as the bottom surface of said mini toilet-seat is provided with groove (24) (as shown in FIG. 4), therefore, it can be firmly fitted on said toilet-seat (1). The supporting bar (6) is perpendicular to the ground and it is adjusted to the same height of the stool. The slanting bar (4) is opened widely about 45 degrees with the supporting bar (6), the metallic strip (51) of said supporting board (5) can be horizontally engaged with the horizontal bar (41), and thus, the supporting board (5) is secured.

When the preferred embodiment is not in use, said slanting bar (4) and supporting board (5) can be folded at pivots and arranged into a plan. As said slanting bar (4) lies within the supporting bar (6), the horizontal bar (41) of slanting bar (4) will not be entangled with supporting bar (6), therefore, when said mini toilet-seat is moved upward, the whole structure of this invention will lean against the water tank (As shown in FIG. 2).

Although the invention has herein above been described in the presently preferred embodiment, it will be understood by those having skill in the art that the invention is capable of modification and variation, and is limited only by the following claims.

I claim:

1. A foldable mini toilet seat, parallel of set handrails and step assembly for children for use in combination with a conventional toilet including a stool, a seat therefore, pivotally mounted at an end thereof and water tank disposed behind and above said stool, said assembly comprising:

a mini toilet seat pivotally mounted on said toilet at an end thereof adjacent said tank and disposed in the lowered position to rest on said toilet seat; first and second handrails attached to said mini seat at ends adjacent the pivotal mounting and extending on either side thereof; first and second vertical support braces, pivotally mounted at ends thereof each to one of said handrails at ends opposite the ends attached to said mini toilet seat said vertical support braces adapted to support said hand rails when said mini seat rests on said toilet seat; first and second angular support braces pivotally attached at ends thereof, each to one of said vertical braces and extending outwardly and downwardly therefrom when said mini seat rests on said toilet seat; a foldable step extending between said vertical braces and pivotally mounted thereto at one end; and step support brace extending between said angular braces and adapted to support an end of said step opposite the end attached to said vertical support when said step rests thereon whereby when said assembly is in the lower position said mini seat will rest on the toilet seat with said handrails and said step supported by said braces in horizontal positions, and when said assembly is raised, the vertical and angular braces will fold against the underside of said mini seat so that the folded assembly will rest against the tank.

2. The assembly of claim 1 wherein said angular braces in the lowered position extend outwardly from said vertical braces at angles of about 45 degrees.

3. The assembly of claim 2 wherein said angular braces are attached to said vertical braces at about one third the length thereof from the end attached to said handrails.

4. The assembly of claim 1 wherein said vertical and angular braces are adjustable in length.

5. The assembly of claim 1 wherein the lower surface of said mini seat defines a recess adapted to receive and mate with the uppoer portion of said conventional toilet seat when resting thereon.

6. The assembly of claim 1 wherein said handrails are contained within the plane containing said mini seat.

* * * * *